US010232828B2

(12) United States Patent
Ekola et al.

(10) Patent No.: US 10,232,828 B2
(45) Date of Patent: Mar. 19, 2019

(54) CIRCULAR SPRAY NOZZLE SYSTEM AND METHOD FOR CLEANING A CYLINDRICAL SURFACE OF A COMPONENT

(71) Applicant: GM Global Technology Operations LLC, Detroit, MI (US)

(72) Inventors: Benjamin M. Ekola, South Lyon, MI (US); Thomas W. Jozwiak, Southgate, MI (US); Robert Dallos, Jr., Canton, MI (US); Kevin S. Kidston, New Hudson, MI (US); John H. Bednarchik, Royal Oak, MI (US); Suzanne M. Cody-Gump, Metamora, MI (US); Adam L. Wright, Farmington Hills, MI (US); James N. Nickolaou, Clarkston, MI (US); David A. Young, Huntington Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 181 days.

(21) Appl. No.: 15/354,159

(22) Filed: Nov. 17, 2016

(65) Prior Publication Data
US 2018/0134258 A1    May 17, 2018

(51) Int. Cl.
| *B60S 1/52* | (2006.01) |
| *B60S 1/54* | (2006.01) |
| *B60S 1/56* | (2006.01) |
| *B05B 9/04* | (2006.01) |
| *B05B 12/14* | (2006.01) |

(52) U.S. Cl.
CPC ............... *B60S 1/52* (2013.01); *B05B 9/0423* (2013.01); *B05B 12/14* (2013.01); *B60S 1/56* (2013.01); *B60S 1/54* (2013.01)

(58) Field of Classification Search
CPC ...... B60S 1/52; B60S 1/54; B60S 1/56; B60S 1/60; B60S 1/603; B05B 1/14; B05B 9/0423; B05B 12/14
See application file for complete search history.

(56) References Cited

U.S. PATENT DOCUMENTS

| 2011/0073142 | A1* | 3/2011 | Hattori | B60S 1/0848 134/56 R |
| 2015/0040953 | A1* | 2/2015 | Kikuta | B60S 1/56 134/123 |
| 2015/0151722 | A1* | 6/2015 | Gokan | B60S 1/50 134/102.2 |
| 2015/0183406 | A1* | 7/2015 | Tanaka | B60S 1/56 134/99.1 |
| 2015/0296108 | A1* | 10/2015 | Hayakawa | G03B 17/08 348/148 |
| 2015/0344001 | A1* | 12/2015 | Lopez Galera | B60S 1/56 134/198 |
| 2016/0101735 | A1* | 4/2016 | Trebouet | B60R 1/00 348/148 |

(Continued)

*Primary Examiner* — Darren W Gorman

(57) ABSTRACT

A spray nozzle system includes a housing having an upper cap, a neck portion for helping to support the housing adjacent a component, and at least one fluid flow line for supplying a fluid to an interior area of the housing. A plurality of spray nozzles may be included which are housed in the housing and in communication with the at least one fluid line for distributing the fluid over a circumferential surface of the component.

18 Claims, 3 Drawing Sheets

(56) References Cited

U.S. PATENT DOCUMENTS

2016/0103316 A1* 4/2016 Rousseau ................. B60R 1/00
                                                  359/509
2016/0325715 A1* 11/2016 Niemczyk ............... B60S 1/528
2018/0015907 A1* 1/2018 Rice ........................... B60S 1/56
2018/0081169 A1* 3/2018 Karasik ................. G03B 17/568

* cited by examiner

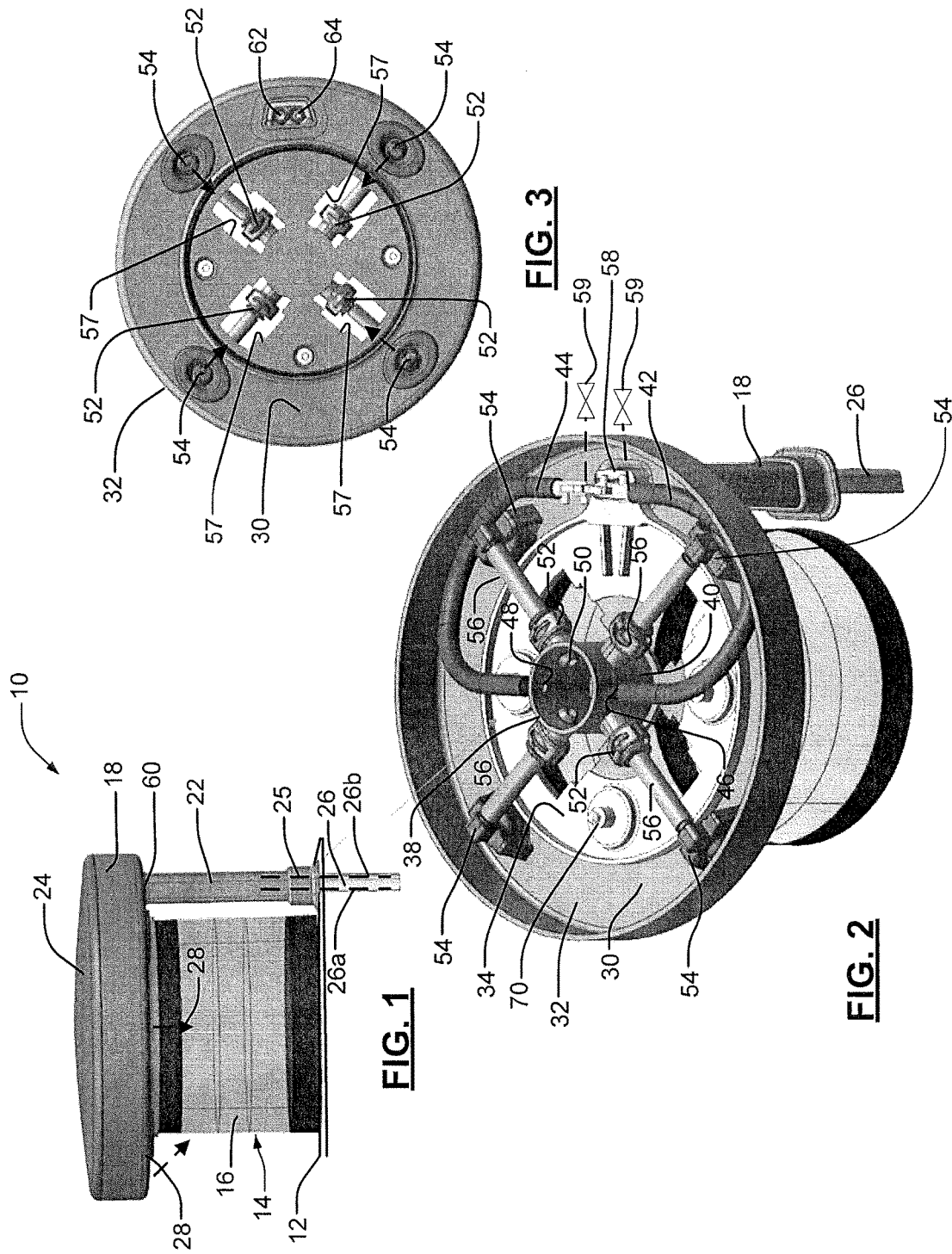

CIRCULAR SPRAY NOZZLE SYSTEM AND METHOD FOR CLEANING A CYLINDRICAL SURFACE OF A COMPONENT

FIELD

The present disclosure relates to systems and methods for cleaning sensors, and more particularly to a spray nozzle which is able to provide a flow of a cleaning solution in a 360 degree path to clean a surface of a sensor.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Light Detection and Ranging ("LIDAR") sensors are becoming increasingly important and desirable in automotive applications. The use of LIDAR sensors is especially important when the sensors are used with self-driving vehicles because they are able to provide real time information on the presence of other vehicles travelling in close proximity to a perimeter of a particular self-driving vehicle.

A challenge, however, with using LIDAR sensors in any type of automotive application is the need to maintain the lens surface of the LIDAR sensor clean. Dust, dirt, rain, mud, salt and other contaminants can collect on the surface of a LIDAR sensor and impede the optical signal that is transmitted to/from a LIDAR sensor. Further complicating matters is the fact that LIDAR sensors used in automotive applications typically need to be able to transmit light pulses within a wide arc, and in many instances within a 360 degree arc. This presents particular challenges in maintaining the full surface area of the sensor's lens clean from contaminants, because simply spraying a cleaning solution from a single fixed point may not suffice to adequately maintain the lens clean.

SUMMARY

In one aspect the present disclosure relates to a spray nozzle system. The system may have a housing including an upper cap, a neck portion for helping to support the housing adjacent a component, and at least one fluid flow line for supplying a fluid to an interior area of the housing. A plurality of spray nozzles may be included which are housed in the housing and in communication with the at least one fluid line for distributing the fluid over a circumferential surface of the component.

In another aspect the present disclosure relates to a spray nozzle system having a housing including an upper cap, a neck portion for helping to support the housing adjacent a component, and first and second fluid lines. The fluid lines supply first and second types of fluids to an interior area of the housing. A plurality of spray nozzles may also be included which are housed in the housing and in communication with the first and second fluid lines. The spray nozzles distribute the first and second fluids over a 360 degree surface of a component to clean the surface of the component.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a side view of one embodiment of a spray nozzle system in accordance with the present disclosure, with the spray nozzle system positioned over an upper end of a cylindrical LIDAR sensor, and with the dashed lines indicating a direction of a fluid that is sprayed on an outer cylindrical surface of the LIDAR sensor lens at a plurality of circumferential positions around the lens to achieve a full, or nearly full, 360 degree coverage of the LIDAR lens;

FIG. 2 is a perspective view of the spray nozzle system of FIG. 1 but without an upper cover of the system to better illustrate various internal components of the spray nozzle system;

FIG. 3 is a bottom view of just the spray nozzle system better illustrating the spray nozzles and connector assemblies which couple each of the spray nozzles to a central plenum;

In the drawings, reference numbers may be reused to identify similar and/or identical elements.

DETAILED DESCRIPTION

Figure 4:
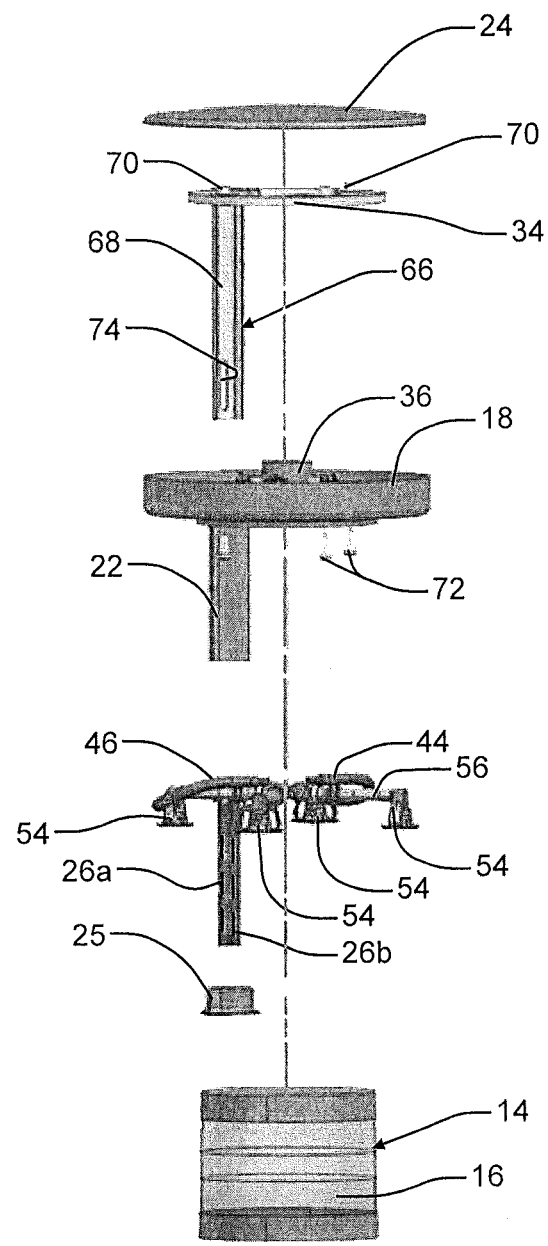
FIG. 4 is an exploded perspective view of major component parts of the spray nozzle system of FIG. 1.

Referring to FIG. 1, a spray nozzle system 10 is illustrated in accordance with one embodiment of the present disclosure. The spray nozzle system 10 is intended to be mounted on an outer surface 12 of a vehicle adjacent to a LIDAR (Light Detecting and Ranging) sensor 14. In this example the LIDAR sensor 14 forms a cylindrical LIDAR sensor having a cylindrical lens 16. The LIDAR sensor 14 is used to project and receive optical signals around its full 360 degree circumference. As such, the entire circumferential surface of the lens 16, or at least a substantial portion of the 360 degree circumference, for example 90%-99%, needs to be maintained free of dust, dirt, mud, rain water, and other contaminants for the LIDAR sensor 14 to operate properly.

With further reference to FIG. 1, the spray nozzle system 10 may include a housing 18 having an upper cylindrical portion 20, a neck portion 22, and an upper cap 24 which covers internal components of the spray nozzle system 10. A slip cap 25 covers a mounting nut (not visible) to help provide a water tight seal where a plurality of fluid lines, indicated by dashed lines 26a and 26b, pass through the outer surface 12 of the vehicle. The fluid lines 26a and 26b, in one embodiment, form independent fluid lines which are used for supplying a cleaning liquid fluid and pressurized air. However, it will be appreciated that the spray nozzle system 10 need not be configured to supply both a cleaning fluid and air; it is within the purview of the present disclosure to provide a spray nozzle system which merely provides one or the other of air or a cleaning fluid. In either implementation, the cleaning fluid and/or air, as denoted by dashed arrows 28 is/are supplied from a plurality of spray nozzles (not visible in FIG. 1) in the housing 18, which are arranged circumferentially around the housing. In this manner the entire surface, or substantially entire 360 degree surface (i.e., 90%-99%) of the lens 16 of the LIDAR sensor 14 can be cleaned without otherwise obstructing the field of view ("FOV") of the sensor.

Referring to FIGS. 2 and 3, the internal components of the spray nozzle system 10 can be seen in greater detail. FIG. 2 shows that the housing 18 may have a lower peripheral wall 30 extending radially inwardly from a circumferential outer sidewall 32. The lower peripheral wall 30 is supported by a lower support wall 34. The lower support wall 34 is part of a mounting bracket, which will be discussed further in the following paragraphs. The lower support wall 34 cooperates with the housing 18 to help the housing 18 form an enclosure. The lower support wall 34 has a cylindrical plenum 36 which is open at an upper end 38 and closed at a lower end 40. In this embodiment an interior area of the plenum 36 is in communication with both a cleaning fluid line 42 and an air line 44 via openings 46 and 48, respectively, in the plenum. The interior area of the plenum 36 also communicates through a plurality of openings, in this example four openings 50, with a corresponding number of connector assemblies 52, which are in turn in fluid communication with the spray nozzles 54 by lengths of conduit 56. The spray nozzles 54 in this example are spaced evenly around the circumference of the housing 18 as shown in FIG. 3, although they need not be perfectly equidistantly spaced. Relief areas 57 formed in the lower support wall 34, best seen in FIG. 3, allow easier use of a tool when connecting the quick lengths of conduit 56 to the connector assemblies 52. It will be appreciated that the spray pattern of each of the spray nozzles 54 will determine the overall number needed to cover the entire 360 degree surface area of the lens 16 of the LIDAR sensor 14. So while four spray nozzles 54 are illustrated in this example embodiment, it is possible that a greater or lesser number of spray nozzles may be required, depending on the coverage pattern of the nozzles.

The spray nozzles 54 are further preferably orientated when mounted, or otherwise formed, such that they direct their sprays radially inwardly, as noted by the arrows 28 in FIG. 1. The sprays 28 preferably strike the lens 16 adjacent an upper area of the lens 16 and flow downwardly to cover the entire surface of the lens 16, or at least substantially the entire surface, that is cover at least about 90%-55%. When mounting the spray nozzle system 10 on a vehicle, this small area of blockage may be considered in deciding how best to directionally orientate the spray nozzle system. Alternatively, if two of the spray nozzle systems 10 are mounted on an exterior surface of a vehicle, such as roof surface, then the orientation of the two assemblies may be arranged so that the small areas of non-coverage of the spray nozzle systems 10 face one another, which enables the pair of spray nozzle systems 10 to still provide a full 360 degree FOV in spite of the small areas of non-coverage on each system.

With further reference to FIGS. 1-3, a fitting 58 (FIG. 2) connects with an upper distal end 60 (FIG. 1) of the neck portion 22. The fitting 58 may form an integral portion of the lower support wall 34, although alternatively it could form an independent component which is fixedly mounted to the lower support wall. The fitting 58 includes a liquid fluid port 62 and an air flow port 64 (FIG. 3). The fluid lines 26a and 26b (FIG. 1), which as noted above in this example include separate liquid cleaning and air flow lines or conduits, extend through the neck portion 18 into communication with the ports 62 and 64, respectively.

Referring briefly to FIG. 4, the various components of the spray nozzle system 10 can be seen in exploded fashion. In particular, FIG. 4 illustrates that a mounting bracket 66 may be included which has a neck portion 68 that fits within the neck portion 22 of the housing 18. The mounting bracket 68 may be coupled to the lower support wall 34 or it may be formed integrally with the lower support wall. The lower support wall 34 may have a plurality of upwardly projecting bosses 70 that engage with suitably dimensioned features (e.g., recesses, not shown) formed on an undersurface of the upper cap 24, to thus hold the upper cap with a snap-fit like attachment to the lower support wall 34. Threaded fasteners 72 may be used to secure the housing 18 to the lower support wall 34.

The neck portion 68 may have a slot 74 that accepts a fastener, for example a threaded fastener (not shown), that may be fastened to a separate structural element below the outer surface 12 of the vehicle and used to help position the entire assembled housing 18 at a desired height above the LIDAR sensor 14. In the present example implementation, preferably the housing 18 is positioned just above an upper edge surface of the lens 16 of the LIDAR sensor 14. Once the mounting bracket 66, housing 18 and upper cap 24 are assembled together they form a watertight assembly.

Figure 5:
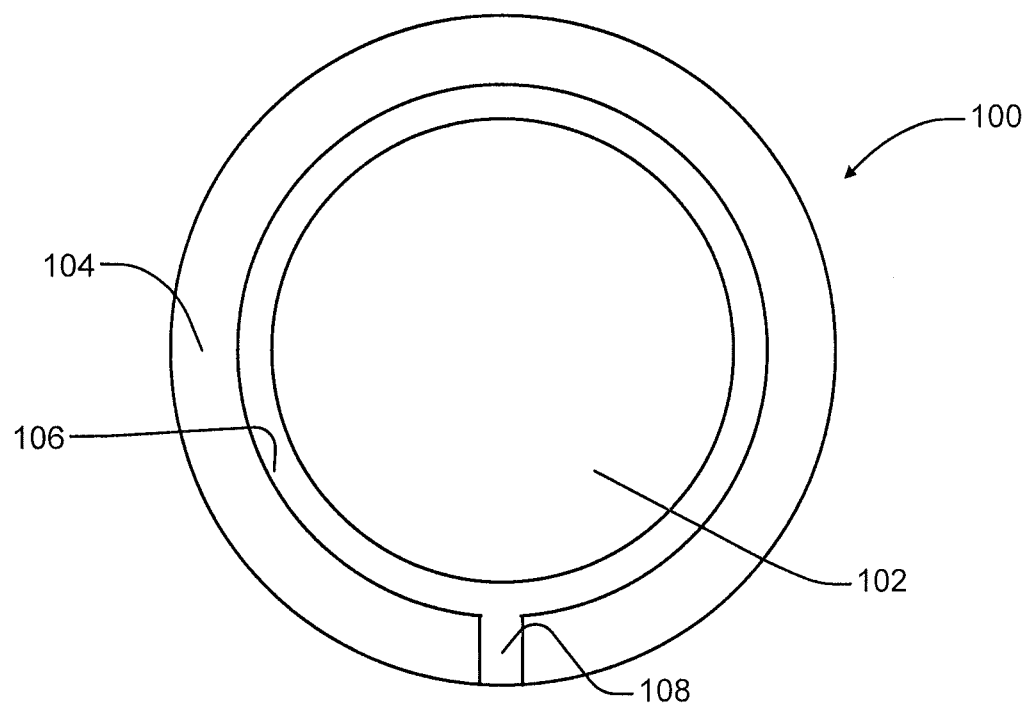
FIG. 5 is a plan view of another embodiment of an upper cap that may be used with the spray nozzle system of FIG. 1, which incorporates a circumferential concave area in communication with a drip channel to channel rain water off the upper cap.
Figure 6:
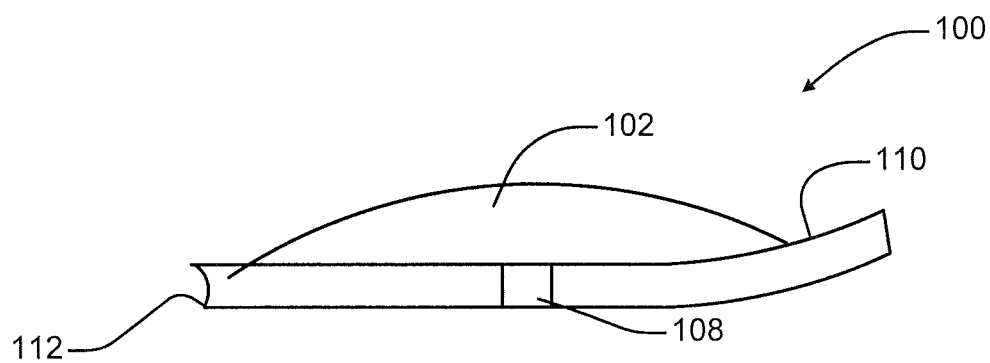
FIG. 6 is a side elevational view of the upper cap of FIG. 5.

With brief reference to FIGS. 5 and 6, another embodiment of an upper cap 100 is shown which may be used to cover the housing 18. The upper cap 100 is somewhat similar to the upper cap 24 but may include a dome-like central portion 102, a perimeter portion 104, and a concave circumferential channel 106 which communicates with a drain channel 108. The dome-like central portion 102 facilitates directing slush, rain water, etc. toward the circumferential channel 106, which acts somewhat like a gutter to collect the fluids, and then to channel the fluids through the drain channel 108. The upper cap 100 may help to keep the lens 16 of the LIDAR sensor 14 clear while it is being used in rainy conditions. Additional feature of the upper cap 100 may include a slightly upturned rear area 110 that may help with aerodynamic performance and to eliminate wind noise, as well as a curved leading lip edge 112 that may form a drip ledge. And while the upper caps 24 and 100 have been illustrated as having a circular shape, along with a circular housing 18, it will be appreciated that the upper caps 24 and 100, as well as the housing 18, may have an oval shape, an oblong shape, a teardrop shape, or virtually any other shape that best meets the needs of a particular application.

In operation of the spray nozzle system 10, a liquid cleaning fluid, for example a windshield washer solution, may be pumped from a washer fluid reservoir (not shown) through fluid line 26a, through the port 62, through conduit 42, and into the plenum 36. From the plenum 36 the liquid cleaning fluid may be generally evenly distributed through conduits 56 to the spray nozzles 54. The liquid cleaning fluid may be applied in one or more pulses or as a continuous stream from the spray nozzles 54 to fully, or at least substantially (i.e., 90%-99%), cover the lens 16. Additionally, air may be supplied through the fluid line 26b into the fitting 58, through the port 64, into the conduit 44, and into the plenum 36. The plenum 36 may distribute the air generally evenly to the spray nozzles 54 to help blow off the liquid cleaning fluid from the lens 16. Optionally, but preferably, separate one-way check valves 59 may be placed at the interfaces between the fitting 58 and the conduit 42, and the fitting 58 and the conduit 44. The one-way check valves 59 eliminate any possibility of the cleaning liquid fluid being pumped into the fluid line 26b (i.e., the air line conduit), as well as to prevent air from being pumped into the liquid fluid line 26a.

While the spray nozzle system 10 has been described with spray nozzles 54 that provide a downward and radially inward spray of cleaning fluid or air, it will be appreciated that the housing 18 could be formed to circumscribe the lower circumferential portion of the LIDAR sensor 14, and the spray nozzles 54 could be arranged to provide an upward, radially inwardly directed spray onto the lens 16 of the LIDAR sensor 14.

Still further, while the spray nozzle system 10 has been described for use in an application to apply a cleaning fluid and an air flow to a sensor lens, it will be appreciated that the system could be adapted for other applications. For example, the system could potentially be used to spray a lubricating fluid directly onto a circumferential surface. Alternatively, the spray nozzle system 10 could be adapted to spray cooling fluid onto a circumferential surface of a component. As such, the spray nozzle system 10 is not limited to use in only applications where cleaning of a circumferential surface is needed.

Still further, it will be appreciated that the amount of air or cleaning fluid could be varied at each spray nozzle 54. The system 10 could also be modified to collect the used cleaning fluid at a lower area of the spray nozzle system 10, for either reuse subsequent to filtering out debris or draining of the used fluid to a lower portion of a vehicle on which the system 10 is being used. Furthermore, cleaning may also include de-icing the lens 16.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the FIGS., the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A spray nozzle system comprising:
   a housing including an upper cap;
   a light detection and ranging (LIDAR) sensor comprising a cylindrical lens through which the LIDAR sensor projects optical signals and receives optical signals;
   a neck portion configured to support the housing adjacent to the cylindrical lens;
   a fluid flow line for supplying a fluid to an interior area of the housing; and
   a plurality of spray nozzles housed in the housing and in communication with the fluid flow line, the plurality of spray nozzles configured to distribute the fluid over an outer surface of the cylindrical lens at an acute angle relative to the outer surface of the cylindrical lens.

2. The spray nozzle system of claim 1, wherein the spray nozzles distribute the fluid over at least 90 to 99 percent of the outer surface of the cylindrical lens.

3. The spray nozzle system of claim 1, wherein the spray nozzles are equidistantly spaced in a circumferential pattern.

4. The spray nozzle system of claim 1, wherein the fluid flow line extends through an interior of the neck portion.

5. The spray nozzle system of claim 1, further comprising an additional fluid flow line for supplying an additional fluid to the plurality of spray nozzles.

6. The spray nozzle system of claim 5, wherein the fluid comprises a liquid cleaning fluid and the additional fluid comprises air.

7. The spray nozzle system of claim 1, wherein the housing includes a plenum for receiving the fluid from the fluid flow line and distributing the fluid to the plurality of spray nozzles.

8. The spray nozzle system of claim 5, wherein the housing includes a plenum for receiving and distributing the fluid and the additional fluid to the plurality of spray nozzles.

9. The spray nozzle system of claim 1, further comprising a mounting bracket having a neck portion, and a lower support wall, the lower support wall cooperating with the housing to form an enclosure, and the mounting bracket including a slot to enable adjustable positioning of the housing relative to a surface from which the spray nozzle system is supported.

10. The spray nozzle system of claim 6, wherein the upper cap includes a concave circumferential channel for collecting fluid, and a drain channel in communication with the concave circumferential channel for draining the fluid off of the upper cap.

11. The spray nozzle system of claim 9, wherein the upper cap includes an upturned rear portion.

12. A spray nozzle system comprising:
a housing including an upper cap;
a cylindrical lens through which a sensor projects optical signals and receives optical signals;
a neck portion configured to support the housing adjacent to the cylindrical lens;
first and second fluid lines for supplying first and second fluids to an interior area of the housing; and
a plurality of spray nozzles housed in the housing and in communication with the first and second fluid lines for distributing the first and second fluids over an outer surface of the cylindrical lens to clean the outer surface of the cylindrical lens.

13. The system of claim 12, wherein the housing includes a plenum in communication with the first and second fluid lines and each one of the plurality of spray nozzles, for distributing the first and second fluids to the plurality of spray nozzles.

14. The system of claim 13, wherein the housing further includes a fitting in communication with the first and second fluid lines.

15. The system of claim 14, further comprising a pair of conduits in communication with the fitting for providing independent flow paths to the plenum for the first and second fluids.

16. The system of claim 12, wherein the upper cap includes a concave circumferential channel for collecting fluid, and a drain channel in communication with the concave circumferential channel for draining the fluid off of the upper cap.

17. The system of claim 14, wherein the upper cap includes an upturned rear portion.

18. The system of claim 12 wherein the plurality of spray nozzles are configured to distribute the first and second fluids over the outer surface of the cylindrical lens at an acute angle relative to the outer surface of the cylindrical lens.

* * * * *